(12) United States Patent
Kataoka et al.

(10) Patent No.: US 10,067,403 B2
(45) Date of Patent: Sep. 4, 2018

(54) OPTICAL MODULATOR AND OPTICAL SWITCH

(71) Applicant: SUMITOMO OSAKA CEMENT CO., LTD., Tokyo (JP)

(72) Inventors: Toshio Kataoka, Tokyo (JP); Junichiro Ichikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/504,292

(22) PCT Filed: Aug. 31, 2015

(86) PCT No.: PCT/JP2015/074674
§ 371 (c)(1),
(2) Date: Feb. 15, 2017

(87) PCT Pub. No.: WO2016/032004
PCT Pub. Date: Mar. 3, 2016

(65) Prior Publication Data
US 2017/0235207 A1    Aug. 17, 2017

(30) Foreign Application Priority Data
Aug. 29, 2014 (JP) ................................ 2014-175188

(51) Int. Cl.
*G02F 1/313* (2006.01)

(52) U.S. Cl.
CPC .......... *G02F 1/3134* (2013.01); *G02F 1/3133* (2013.01)

(58) Field of Classification Search
None
See application file for complete search history.

(56) References Cited

U.S. PATENT DOCUMENTS

2017/0235207 A1* 8/2017 Kataoka et al. ........ G02G 1/313

FOREIGN PATENT DOCUMENTS

| JP | 07-221512 A | 8/1995 |
|---|---|---|
| JP | 09-093223 A | 4/1997 |
| JP | 2007-139987 A | 6/2007 |
| JP | 2011-013646 A | 1/2011 |
| JP | 2012-048121 A | 3/2012 |

OTHER PUBLICATIONS

International Search Report for PCT/JP2015/074674 (dated Nov. 10, 2015).

* cited by examiner

*Primary Examiner* — Tina Wong
(74) *Attorney, Agent, or Firm* — Merchant & Gould P.C.

(57) ABSTRACT

Provided is an optical modulator including: a relay substrate; a first transmission line that is provided on a flat surface of the relay substrate, and transmits, along the flat surface of the relay substrate, an electrical signal that has been input from an outer side; a second transmission line that is provided in the relay substrate, and transmits the electrical signal in a direction that is not included in the flat surface; a modulation unit that modulates an optical signal by using the electrical signal that is transmitted by the first transmission line and the second transmission line; and a shield that shields a radiation component of the electrical signal that is radiated from a contact of the first transmission line and the second transmission line.

4 Claims, 10 Drawing Sheets

OPTICAL MODULATOR AND OPTICAL SWITCH

TECHNICAL FIELD

The present invention relates to an optical modulator and an optical switch.

The present application is a National Stage Application under 35 U.S.C. § 371 of International Application No. PCT/JP2015/074674 filed Aug. 31, 2015, which claims the benefit of priority to Japanese Patent Application No. 2014-175188, filed Aug. 29, 2014, the disclosures of all of which are hereby incorporated by reference in their entireties. The International Application was published in Japanese on Mar. 3, 2016 as WO 2016/032004.

BACKGROUND ART

Recently, reduction in size of an optical transceiver (transponder) and reduction in cost thereof have progressed.

According to this, even in an optical modulator module that is mounted in an optical transceiver, a reduction in footprint size is in progress, and a method, in which usage of a coaxial connector is avoided and a plurality of signal lines are collectively surface-mounted for connection, is employed in industry specifications (OIF2014.099.00). Research and development of the method are in progress.

In this regard, there is known an optical modulator module including an optical modulator including a signal electrode and a ground electrode, a conductive housing that accommodates the optical modulator and is electrically connected to the ground electrode of the optical modulator, a substrate in which aground electrode that is connected to an external wall of the housing with solder or a conductive adhesive is formed on one surface, and a signal electrode is formed on the other surface, and a lead pin that electrically connects the signal electrode of the optical modulator and the signal electrode of the substrate (refer to Patent Literature No. 1).

In addition, there is known an optical modulator including a substrate having an electro-optic effect, an optical waveguide that is formed on the substrate, an optical modulation element including a modulation electrode configured to modulate light that passes through the inside of the optical waveguide, and a connection substrate that is disposed on an outer side of the substrate and supplies a microwave signal for driving the optical modulator element to the optical modulator element. A signal input end and a signal output end are formed on the connection substrate, and the connection substrate is provided with reimaging suppression means that suppresses recoupling of a radiation mode of the microwave signal, which is input to the signal input end, to the signal output end (refer to Patent Literature No. 2).

CITATION LIST

Patent Literature

Patent Literature No. 1: Japanese Laid-open Patent Publication No. 2012-48121
Patent Literature No. 2: Japanese Laid-open Patent Publication No. 2007-139987

SUMMARY OF INVENTION

Technical Problem

However, in the optical modulator module of the related art, transmission characteristics of an electrical signal, which is input to the optical modulator module, may deteriorate due to a cavity resonance phenomenon that is caused by reflection of a radiation component of the electrical signal, which is emitted from a lead pin or a via provided in the substrate to the inside of the housing toward a vertically upward side or a vertically downward side, from an inner wall surface of the housing.

Accordingly, the invention has been made in consideration of the problem in the related art, and an object thereof is to provide an optical modulator and an optical switch which are capable of suppressing deterioration of transmission characteristics of an electrical signal.

Solution to Problem

According to an aspect of the invention, there is provided an optical modulator including: a relay substrate; a first transmission line that is provided on a flat surface of the relay substrate, and transmits, along the flat surface, an electrical signal that has been input from an outer side; a second transmission line that is provided in the relay substrate, and transmits the electrical signal in a direction that is not included in the flat surface; a modulation unit that modulates an optical signal by using the electrical signal that is transmitted by the first transmission line and the second transmission line; and a shield that shields a radiation component of the electrical signal that is radiated from a contact of the first transmission line and the second transmission line.

In addition, according to another aspect of the invention, the optical modulator may further include a housing in which the relay substrate and the modulation unit are provided. The shield may be a member that is provided separately from the housing, and is electrically connected to the housing.

In addition, according to still another aspect of the invention, in the optical modulator, the relay substrate may be a multilayer substrate in which a plurality of layers are laminated.

In addition, according to still another aspect of the invention, in the optical modulator, the shield may be either a plate member that covers at least the contact in a radiation of the radiation component, or a bonding wire that bridges on the radiation side.

In addition, according to still another aspect of the invention, there is provided an optical switch including: a relay substrate; a first transmission line that is provided on a flat surface of the relay substrate, and transmits, along the flat surface, an electrical signal that has been input from an outer side; a second transmission line that is provided in the relay substrate, and transmits the electrical signal in a direction that is not included in the flat surface; a modulation unit that modulates an optical signal by using the electrical signal that is transmitted by the first transmission line and the second transmission line; a shield that shields a radiation component of the electrical signal that is radiated from a contact of the first transmission line and the second transmission line; and a switch that switches an output of the optical signal.

Advantageous Effects of Invention

According to the invention, it is possible to provide an optical modulator and an optical switch which are capable of suppressing deterioration of transmission characteristics of an electrical signal._

DESCRIPTION OF EMBODIMENTS

<First Embodiment>

Figure 1:
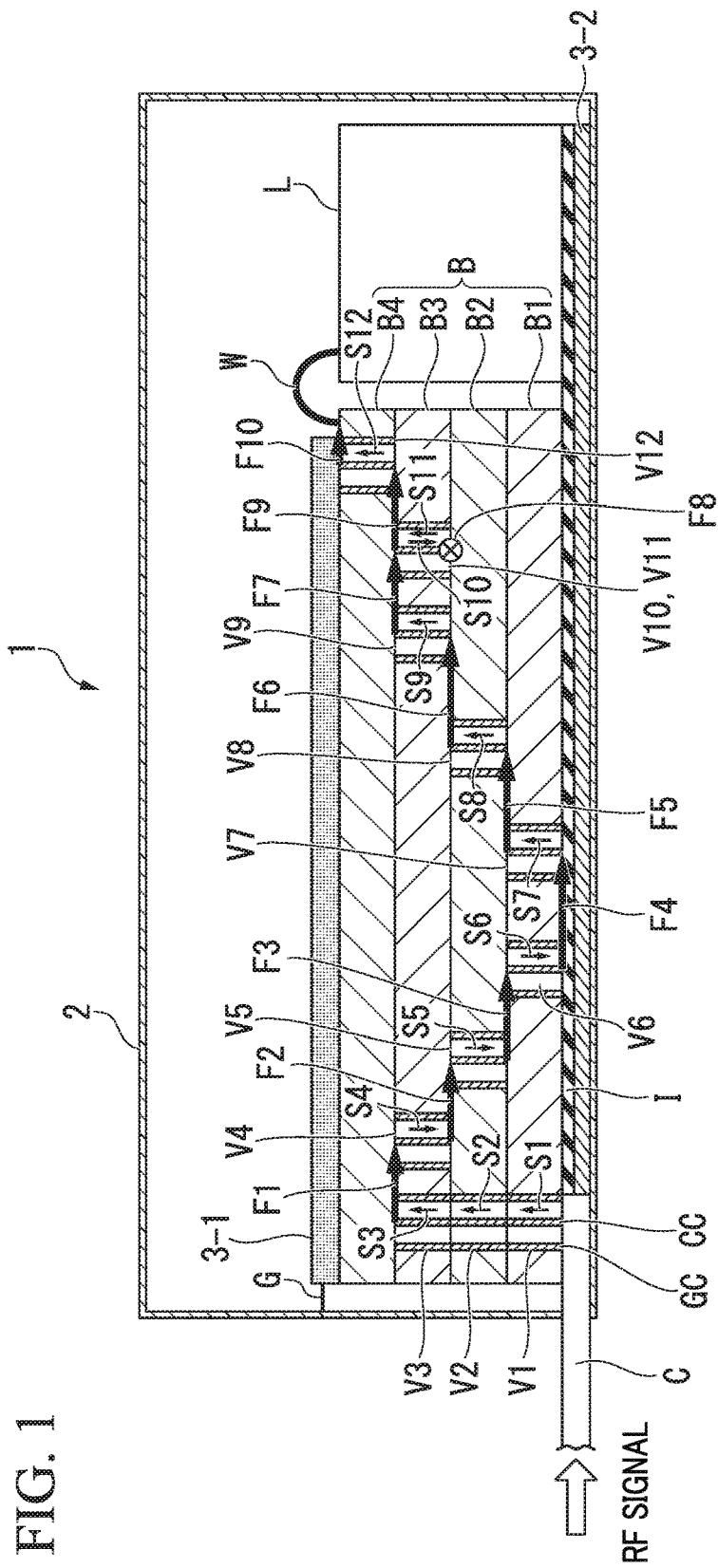
FIG. 1 is a cross-sectional view illustrating a configuration example of an optical modulator 1 according to a first embodiment.

Hereinafter, a first embodiment of the invention will be described with reference to the accompanying drawings. FIG. 1 is a cross-sectional view illustrating a configuration example of an optical modulator 1 according to the first embodiment. For example, the optical modulator 1 is connected to an outer side through a flexible cable C. The outer side represents another substrate, and examples of the outer side include a signal source for optical communication and the like. In the following description, the signal source for optical communication is simply referred to as a signal source for convenience of explanation. In addition, in the following description, the other substrate is set as a substrate that is mounted in the signal source. A radio frequency (RF) signal output from the signal source is input to the optical modulator 1. The optical modulator 1 transmits the RF signal, which is acquired from the signal source, to an optical modulation section chip L through a relay substrate B and a bonding wire W, and modulates the optical signal. Furthermore, the number of vibrations of the RF signal in this embodiment is set to a certain extent (for example, approximately several tens of GHz) in which an optical signal is modulated into a wavelength of a microwave by the optical modulation section chip L, but the number of vibrations may be set to another value. The RF signal is an example of the electrical signal.

The optical modulator 1 includes the optical modulation section chip L, a housing 2, five-layer relay substrates B1 to B4, and two sheets of shields 3-1 and 3-2. Furthermore, the optical modulator 1 may be provided with five or greater sheets of relay substrates or three or less sheets of relay substrates. In addition, the optical modulator 1 may be provided with three or greater sheets of shields or only one sheet of shield. In the following description, if it is not necessary to discriminate the relay substrates B1 to B4 from each other, the relay substrates B1 to B4 will be collectively referred to as a relay substrate B for convenience of explanation. In addition, in the following description, if it is not necessary to discriminate the shields 3-1 and 3-2 from each other, the shields 3-1 and 3-2 will be collectively referred to as a shield 3.

The optical modulation section chip L includes a substrate containing lithium niobate, and modulates an optical signal, which is input from a light source (not illustrated) to the substrate (not illustrated) containing lithium niobate, by using an RF signal that is acquired by the optical modulator 1. The optical modulation section chip L is an example of a modulation unit.

The housing 2 is a metallic container in which the relay substrate B, the shield 3, and the optical modulation section chip L are provided on an inner side thereof. For example, the housing 2 is formed from a steel special use stainless (SUS) material and the like. Furthermore, the housing 2 in this embodiment is set to have a rectangular parallelepiped shape, but other shapes can be employed.

The relay substrates B1 to B4 are ceramic substrates including one or greater vias V, and are provided with a transmission line F through which an RF signal is transmitted. Here, the transmission line F is a general term of transmission lines F1 to F10. In addition, the relay substrates B1 to B4 are substrates in which the transmission line F is provided in both of an upper layer and a lower layer. Furthermore, the relay substrates B1 to B4 may be substrates in which the transmission line is provided in any one of the upper layer and the lower layer.

The via V is a line that penetrates the relay substrate B, and relays an upper-layer transmission line F and a lower-layer transmission line F of the relay substrate B. In addition, as illustrated in FIG. 1, the via V is a coaxial line in which a central conductor CC and a ground conductor GC are provided in a concentric shape around a concentric axis, and a dielectric body DB (for example, alumina, glass, and the like) is provided in a space between the central conductor CC and the ground conductor GC. In the via V of this embodiment, for example, a diameter of the central conductor CC is 0.1 mm, an inner diameter of the ground conductor GC is 1.36 mm, and a dielectric constant of the dielectric body DB is 9.8. Instead of the diameters and the dielectric constant, other diameters or other dielectric constants may be employed. Here, an arrow S1 to an arrow S12 in FIG. 1 represent a transmission direction of the RF signal that is transmitted by the central conductor CC of each of a via V1 to via V12. Furthermore, the transmission line F, which is provided in any one or both of the upper layer and the lower layer of the relay substrates B1 to B4, is an example of a first transmission line. In addition, the via V is an example of a second transmission line.

The relay substrate B1 includes the via V1, the via V6, and the via V7. The relay substrate B2 includes the via V2, the via V5, and the via V8. The relay substrate B3 includes the via V3, the via V4, the via V9, the via V10, and the via V11 (in FIG. 1, the via V11 is hidden by the via V10). The relay substrate B4 includes the via V12. Furthermore, in this embodiment, the name of the via V is the name that indicates any one of the via V1 to the via V12.

As illustrated in FIG. 1, in the relay substrate B, the relay substrate B1, the relay substrate B2, the relay substrate B3, and the relay substrate B4 are laminated in this order from a bottom surface side in an internal space of the housing 2. In addition, the relay substrate B is bonded to the housing 2 through the shield 3-2. Through the bonding, the relay substrate B has a structure of being sandwiched between the shield 3-1 and the shield 3-2. In this structure, the optical modulator 1 can more reliably suppress a cavity resonance phenomenon due to a radiation component of an RF signal (that is, an electrical signal) to be described later. In addition to this, when the ceramic relay substrate B is directly bonded to the metallic housing 2, a crack may occur due to a difference in a volume variation by heat between the relay substrate B and the housing 2. So as to suppress this phenomenon, it is desirable for the relay substrate B1 in the lowest layer to be bonded to the housing 2 through the shield 3-2.

In addition, the relay substrate B1 is electrically separated from the shield 3-2 by an insulator I. For example, the insulator I suppresses electrical connection between a part or the entirety of the via V6, the transmission line F4, and the via V7, and the shield 3-2 in FIG. 1. In addition, connection of the relay substrate B1 in the lowest layer is established in such a manner that an RF signal can be input thereto from the flexible cable C through a glass lead pin and the like.

Figure 2:
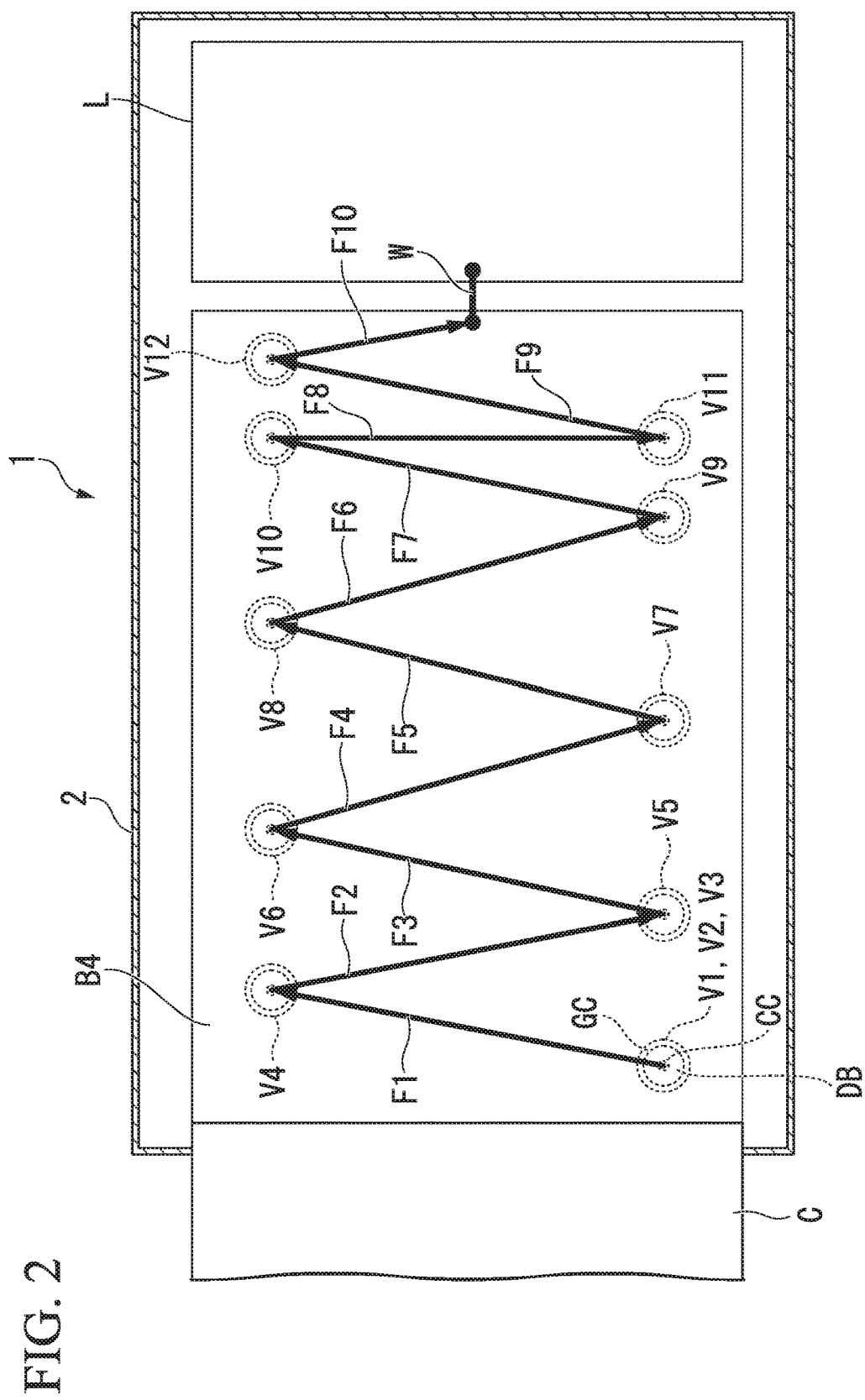
FIG. 2 is a view illustrating an example of the inside of a housing 2 when the optical modulator 1 illustrated in FIG. 1 is seen from a vertically upward side to a vertically downward side.

In the following description, the relay substrate B1 to the relay substrate B4, which are laminated, are collectively referred to as a multilayer substrate. The multilayer substrate transmits an RF signal, which is acquired from the flexible cable C, to the optical modulation section chip L through the transmission line and the via V which are provided in the relay substrate B, and the bonding wire W. When the relay substrate is made as a multilayer substrate, it is possible to integrate an electrode that is necessary for impedance matching. Here, description will be given of transmission of an RF signal by using the multilayer substrate with reference to FIGS. 1 and 2. FIG. 2 is a view illustrating an example of the inside of the housing 2 when the optical modulator 1 illustrated in FIG. 1 is seen from a vertically upward side to a vertically downward side. In addition, in FIG. 2, the shield 3-1 is omitted for convenience of explanation.

The RF signal passes through the via V, and is transmitted to the transmission line F that is provided in each of the relay substrate B1 and the relay substrate B4 which constitute the multilayer substrate. In other words, the RF signal passes through the via V and is transmitted through the multilayer substrate in a lamination direction (vertical direction) of the relay substrate B in FIG. 1. In addition, the RF signal is transmitted from the via V1 to the via V12 through the transmission lines F1 to F10 indicated by an arrow in FIGS. 1 and 2. In addition, the RF signal is transmitted from the via V12 to the bonding wire W through a transmission line that is provided in an upper layer of the relay substrate B4. The RF signal, which is transmitted to the bonding wire W, is transmitted to the optical modulation section chip L through the bonding wire W, and modulates an optical signal. Furthermore, in each of the relay substrate B1 to the relay substrate B4, a position at which the via V or the transmission line F is provided, a shape of the via V or the transmission line F, and the like are illustrative only, and there is no limitation thereto. In addition, the transmission line F in FIG. 2 is illustrated to come into contact with the ground conductor GC of the via V for simplification of the drawing. However, actually, the transmission line F is provided in the relay substrate B not to come into contact with the ground conductor GC of the via V.

Figure 3:
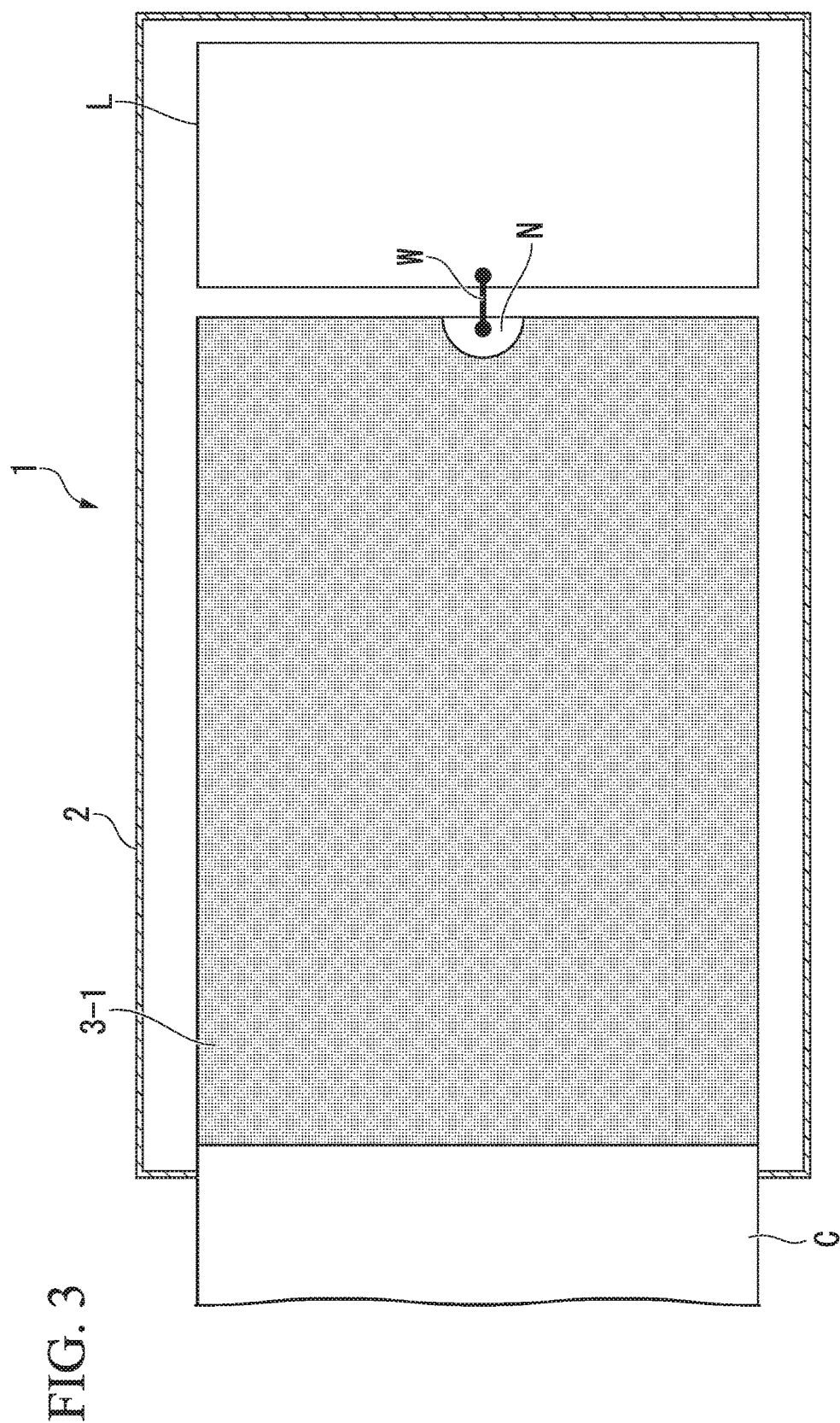
FIG. 3 is a view illustrating an example of the inside of the housing 2 illustrated in FIG. 1 when seen from a vertically upward side to a vertically downward side.

For example, the shield 3-1 is a plate member that covers approximately the entirety of an upper surface of the uppermost layer of the multilayer substrate illustrated in FIG. 2. Furthermore, the shield 3-1 may be provided between parts or the entirety of the plurality of layers of the multilayer substrate. In addition, a material of the shield 3-1 is a conductive material, and examples thereof include gold, aluminum, copper, and the like. In addition, the shield 3-1 is a member that is provided separately from the housing 2. Here, the shield 3-1 will be described with reference to FIG. 3. FIG. 3 is a view illustrating an example of the inside of the housing 2 illustrated in FIG. 1 when seen from a vertically upward side to a vertically downward side. As illustrated in FIG. 3, "approximately the entirety of an upper surface" represents a range excluding the vicinity N of a position, at which the bonding wire W is provided, in the upper layer of the relay substrate B4. Furthermore, the shield 3-1 may be a plate member that covers the entirety of an upper surface of the multilayer substrate illustrated in FIG. 2. In this case, transmission of the RF signal output from the multilayer substrate to the optical modulation section chip L is performed from a position between parts of the relay substrate B by the bonding wire W.

Figure 4:
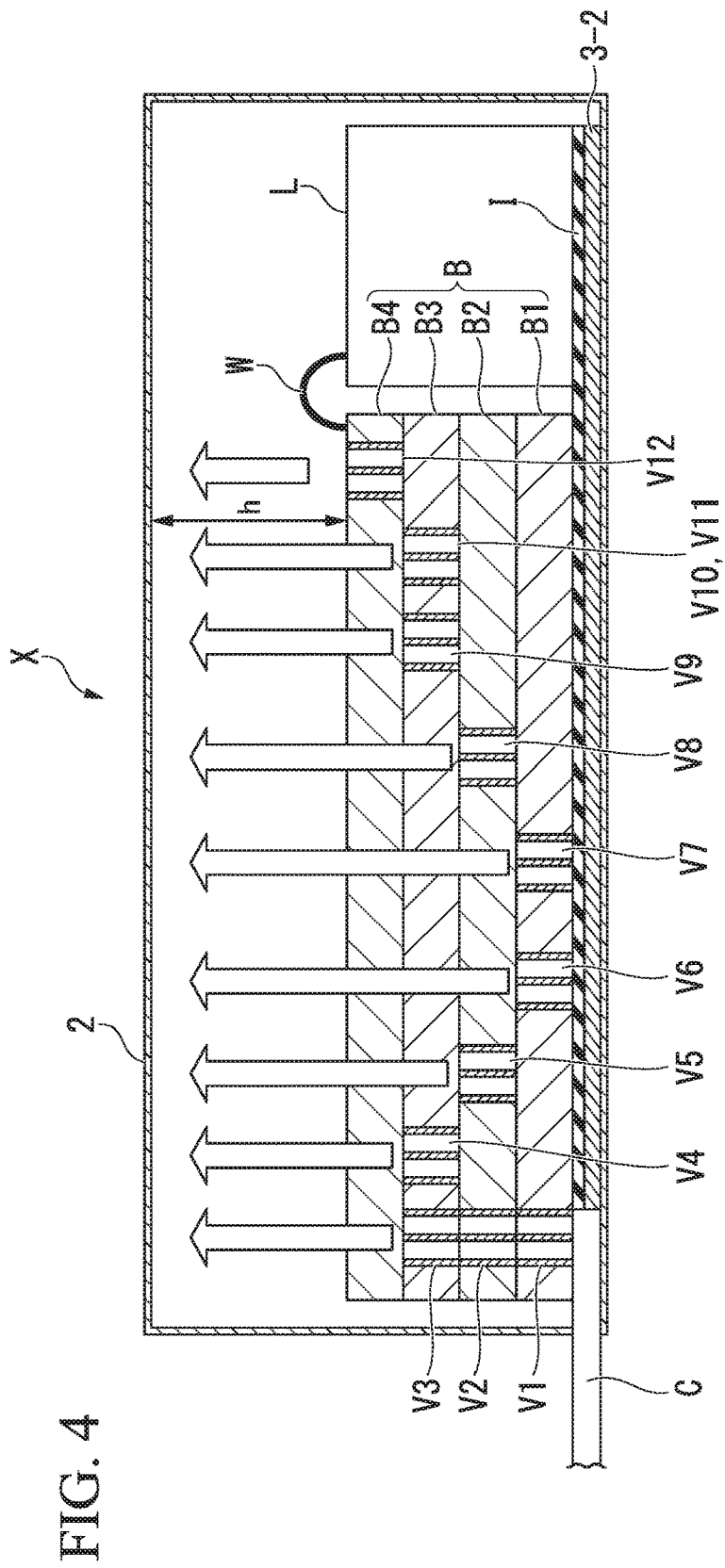
FIG. 4 is a view illustrating a configuration example of an optical modulator X that is not provided with a shield 3-1.

In addition, the shield 3-1 shields a radiation component of the RF signal, which is radiated from an immediately upward side of each of the vias V illustrated in FIG. 2 toward an inner space (an internal upper surface of the housing 2) of the housing 2. Furthermore, a surface of the via V when the via V is seen from an immediately upper side is an example of an emission surface of a radiation component of an electrical signal. Here, description will be given of the radiation component of the RF signal which is shielded by the shield 3-1 with reference to FIG. 4. FIG. 4 is a view illustrating a configuration example of an optical modulator X that is not provided with the shield 3-1. In addition, in FIG. 4, the transmission line F is omitted.

When the optical modulator X is not provided with the shield 3-1, the via V emits a radiation component of an RF signal to an internal space of the housing 2 in an immediately upward direction of the via V (a direction from the relay substrate B1 to the relay substrate B4 which constitute the multilayer substrate illustrated in FIG. 4). In the following description, the radiation component of the RF signal is simply referred to as a radiation component for convenience of explanation. In FIG. 4, an arrow, which is illustrated on an immediately upward side of the via V, represents the radiation component. Emission of the radiation component from the via V is a phenomenon caused by the via V that functions as an antenna during transmission of the RF signal by the via V. When the radiation component, which is radiated in an immediately upward direction of the via V, is radiated to an internal space of the housing 2, the housing 2 reflects the radiation component.

When the reflection occurs, if a predetermined condition is satisfied, the radiated radiation component and the reflected radiation component cause interference, and thus the cavity resonance phenomenon occurs. The above-described predetermined condition represents a case where ¼ wavelength of the RF signal is equal to a distance from a position from which the radiation component is radiated to a position from which the radiation component is reflected (for example, a height h illustrated in FIG. 4 in a case of a radiation component radiated from the via V12). For example, when the height h is set to 3 mm, a transmission distance at which the radiation components are recoupled is 6 mm. In this case, when the frequency of the RF signal is in the vicinity of 25 GHz, the cavity resonance phenomenon occurs, and transmission characteristics of the RF signal are attenuated due to the cavity resonance phenomenon as described later.

Figure 5:
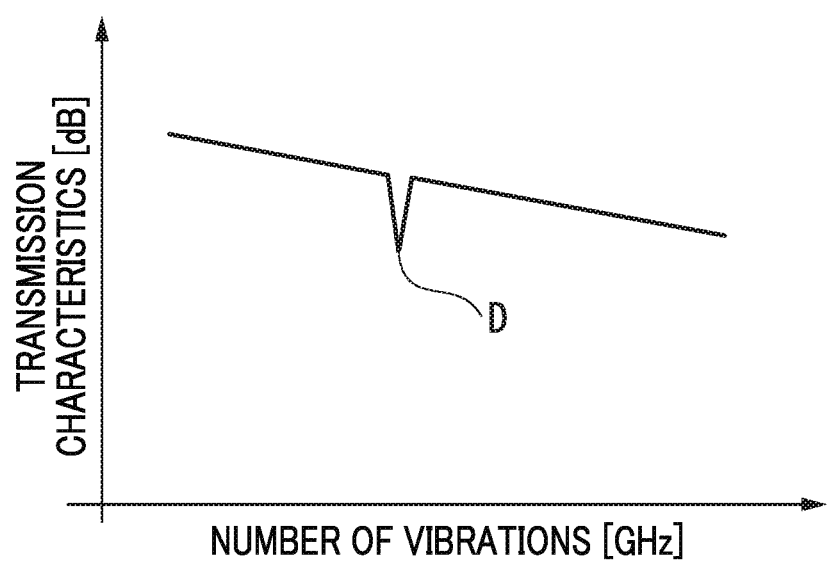
FIG. 5 is a view illustrating an example of a relationship between transmission characteristics of an RF signal that is transmitted by the optical modulator X from a flexible cable C to an optical modulation section chip L, and the number of vibrations of the RF signal.

In a case where the cavity resonance phenomenon occurs, transmission characteristics of the RF signal, which is transmitted by the optical modulator X from the flexible cable C to the optical modulation section chip L, deteriorate due to an effect of a radiation component that causes resonance. FIG. 5 is a view illustrating an example of a relationship between transmission characteristics of the RF signal that is transmitted by the optical modulator X from the flexible cable C to the optical modulation section chip L, and the number of vibrations of the RF signal. In the following description, the transmission characteristics of the RF signal, which is transmitted by the optical modulator X from the flexible cable C to the optical modulation section chip L, is simply referred to transmission characteristics for convenience of explanation.

The horizontal axis of a graph illustrated in FIG. 5 represents the number of vibrations (for example, a unit is [GHz]) of an RF signal. Furthermore, a wavelength of the RF signal is proportional to a reciprocal of the number of vibrations. Accordingly, FIG. 5 illustrates a relationship between the number of vibrations of the RF signal and the above-described transmission characteristics. The vertical axis of the graph illustrated in FIG. 5 illustrates the transmission characteristics (a unit is [dB]). As illustrated in FIG. 5, it can be seen that as the number of vibrations of the RF signal increases (that is, as the wavelength of the RF signal decreases), the transmission characteristics tends to decrease. The decrease tendency occurs due to transmission efficiency in the optical modulator X (when the transmission efficiency is 100%, deterioration does not occur). In addition, from the graph illustrated in FIG. 5, a deep D, which occurs when the RF signal has a predetermined number of vibrations, is confirmed. The deep D represents a site at which the transmission characteristics rapidly decrease in the vicinity of the predetermined number of vibrations of the RF signal. The deep D occurs due to the above-described cavity resonance phenomenon.

The shield 3-1 covers an upper layer of the multilayer substrate and shields a radiation component, which is radiated from an immediately upward side of the via V in order for the deep D, which occurs due to the cavity resonance phenomenon, not to occur. In addition, it is desirable for the shield 3-1 to be grounded. With regard to a method of grounding the shield 3-1, in this example, as illustrated in FIG. 1, the shield 3-1 is connected to the housing 2 with the wire G, but the shield 3-1 may be grounded by another method. In this configuration, when the shield 3-1 shields a part of the radiation component, the shield 3-1 does not function as an antenna. As a result, the shield 3-1 can effectively shield the radiation component without emitting the radiation component into a cavity between the housing 2 and the multilayer substrate. Furthermore, the shield 3-1 may not be grounded. In this case, it is desirable to optimize shielding of the radiation component by any method (that is, to suppress the radiation component radiated from the shield 3-1).

Furthermore, the radiation component also causes reflection between the relay substrates B which constitute the multilayer substrate. However, for example, in a case where the thickness of the relay substrates B (the thickness in a direction in which the relay substrates B, which constitute the multilayer substrate illustrated in FIG. 1, are laminated) is approximately 0.25 mm, a wavelength range of the RF signal is several hundreds of MHz to several tens of GHz, and thus a ¼ wavelength of the RF signal is not equal to a distance from a position from which the radiation component is radiated to a position from which the radiation component is reflected. As a result, the cavity resonance phenomenon due to reflection does not occur.

The shield 3-2 is connected the housing 2 in a direct connection manner or an indirect connection manner through a wire and the like.

In addition, as is the case with the shield 3-1, the shield 3-2 shields a radiation component that is radiated from the via V. The shield 3-2 shields a radiation component that is radiated from an immediately downward side of the via V. In addition, the shield 3-2 bonds the housing 2 and the relay substrate B1 in such a manner that the housing 2 and the relay substrate B1 are not broken due to a volume variation caused by heat. In addition, in addition to the multilayer substrate, the optical modulation section chip L illustrated in FIG. 1 is also provided on an upper side of the shield 3-2. In addition, a material of the shield 3-2 is a conductive material, and examples of the material include gold, aluminum, copper, and the like.

As described above, the optical modulator 1 according to this embodiment includes the relay substrate B, the transmission line F that is provided on a flat surface of the relay substrate B and transmits, along the flat surface of the relay substrate B, the RF signal that has been input from an outer side (for example, a signal source and the like), the via V that is provided in the relay substrate B and transmits the RF signal in a direction that is not included in the flat surface of the relay substrate B, the modulation unit that modulates the optical signal by using the RF signal that is transmitted by the transmission line F and the via V, and the shield 3-1 that shields the radiation component that is radiated from a contact of the transmission line F and the via V. According to this, the optical modulator 1 can suppress deterioration of the transmission characteristics of the RF signal.

<Second Embodiment>

Figure 6:
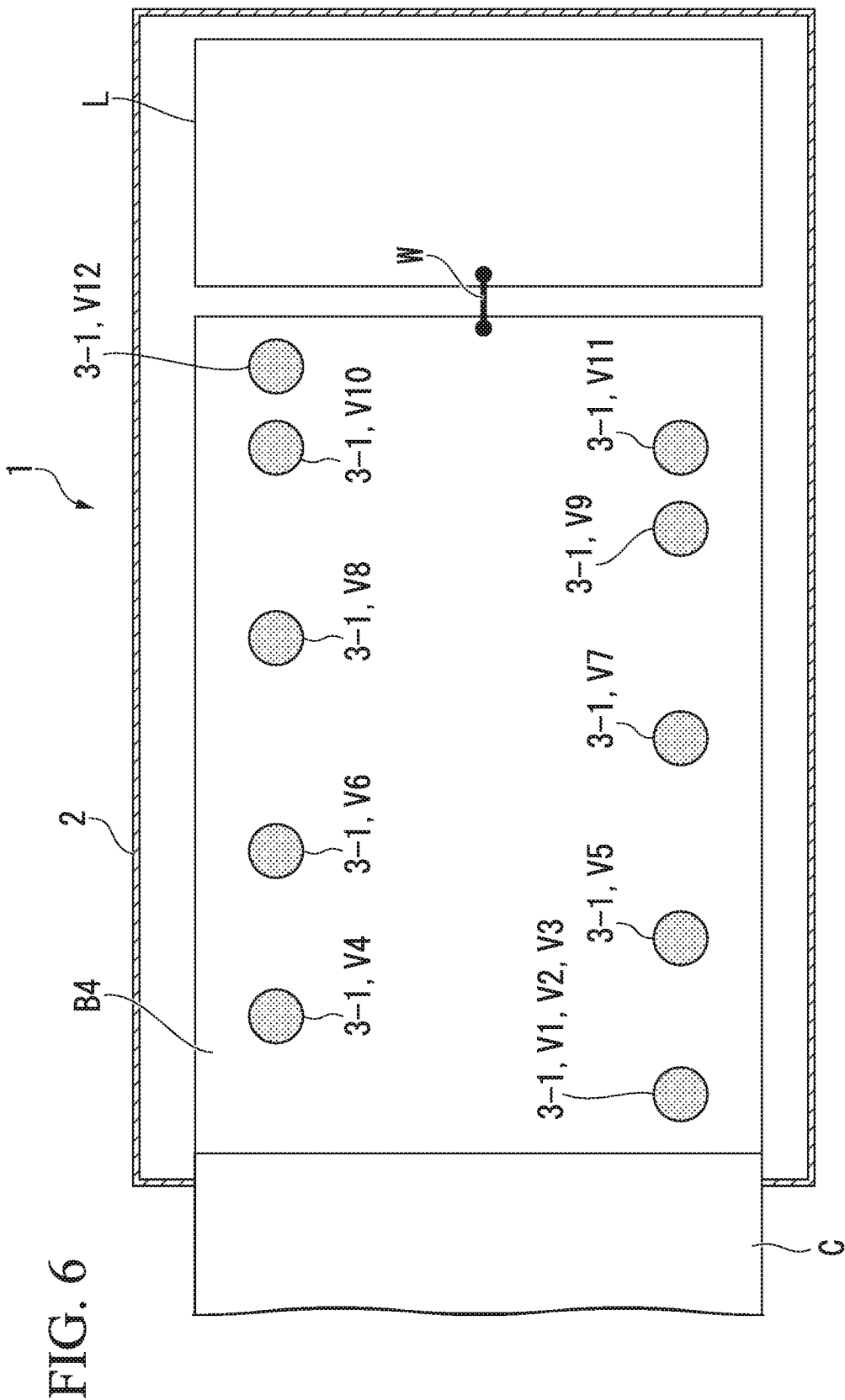
FIG. 6 is a view illustrating an example of the inside of a housing 2 of an optical modulator 1 according to a second embodiment when seen from a vertically upward side to a vertically downward side.

Hereinafter, a second embodiment of the invention will be described with reference to the accompanying drawings. Furthermore, in the second embodiment, the same reference numeral will be given to the same constituent unit as in the first embodiment, and description thereof will be omitted. A shield 3-1 of an optical modulator 1 according to the second embodiment is a disk-shaped member, which is provided only on an immediately upward side of each of the vias V in the multilayer substrate as illustrated in FIG. 6 to cover the via V, instead of the plate member that covers approximately the entirety of the upper surface of the multilayer substrate illustrated in FIG. 2. FIG. 6 is a view illustrating an example of the inside of a housing 2 of the optical modulator 1 according to the second embodiment when seen from a vertically upward side to a vertically downward side. Furthermore, in FIG. 6, connection between the shield 3-1 and the housing 2, and the transmission line F are omitted.

Figure 7A:
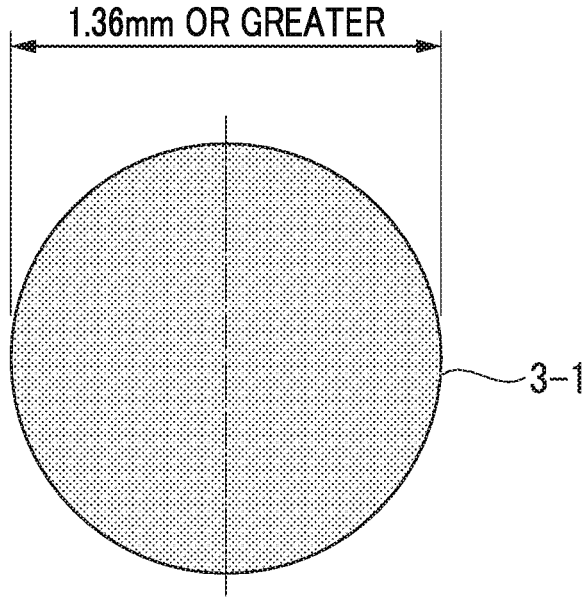
FIGS. 7A and 7B are views illustrating an example of a top plan view and a side view of a shield 3-1 according to the second embodiment.
Figure 7B:
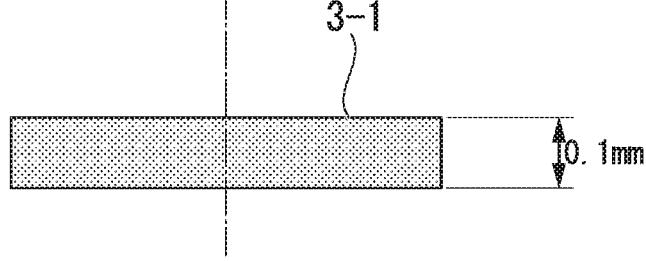

As illustrated in FIG. 6, the shield 3-1 is provided only on an immediately upward side of the via V. Here, for example, in a case where the via V, in which the diameter of the central conductor CC is 0.1 mm, the inner diameter of the ground conductor GC is 1.36 mm, and the dielectric constant of the dielectric body DB is 9.8, is provided in the relay substrate B, the shield 3-1 has a structure illustrated in FIGS. 7A and 7B, and thus it is possible to sufficiently shield a radiation component that is radiated from the via V. A state capable of sufficiently shielding the radiation component represents the following state. Specifically, even when the above-described cavity resonance phenomenon occurs due to the radiation component leaked without being shielded, the cavity resonance phenomenon occurs only to a certain extent in which the deep D does not occur in the transmission characteristics of the optical modulator 1. In addition, the shield 3-1 is provided only on an immediately upward side of the via V, and thus it is possible to more reliably suppress the cavity resonance phenomenon that occurs when the radiation component is leaked to a space between the shield 3-1 and the housing 2 due to any phenomenon. FIGS. 7A and 7B are views illustrating an example of a top plan view and a side view of the shield 3-1 according to the second embodiment.

FIG. 7A illustrates a top plan view of the shield 3-1. In addition, FIG. 7B illustrates a side view of the shield 3-1. As illustrated in FIG. 7A, an upper surface of the shield 3-1 has an area that is equal to or greater than a circular area (range capable of covering the via V) in which a diameter is 1.36 mm. In addition, as illustrated in FIG. 7B, a lateral surface of the shield 3-1 has a thickness of 0.1 mm or greater. Furthermore, the dimensions are examples of a case where the via V, in which the diameter of the central conductor CC is 0.1 mm, the inner diameter of the ground conductor GC is 1.36 mm, and the dielectric constant of the dielectric body DB is 9.8, is provided in the relay substrate B. In the via V, if parts or the entirety of the diameter of the central conductor CC, the inner diameter of the ground conductor GC, and the dielectric constant of the dielectric body DB are changed, the diameter or the thickness of the shield 3-1 is different from a value illustrated in FIGS. 7A and 7B in accordance with the change. In addition, the shield 3-1 may not have a circular shape as long as the shield 3-1 can cover the via V, and may have a rectangular shape or other shapes. As described above, when the shield 3-1 is provided to cover only an immediately upward side of the via V, it is possible to sufficiently shield the radiation component that is radiated from the via V. Furthermore, the immediately upward side of the via V is an example of a radiation component radiation side of the contact of the first transmission line and the second transmission line.

As described above, in the optical modulator 1 according to the second embodiment, the circular shield 3-1, which is provided on an immediately upward side of the via V, is provided on the multilayer substrate. According to this, the optical modulator 1 can attain the same effect as in the first embodiment.

<Third Embodiment>

Hereinafter, a third embodiment of the invention will be described with reference to the accompanying drawings. Furthermore, in the third embodiment, the same reference numeral will be given the same constituent unit as in the first embodiment, and description thereof will be omitted. A shield 3-1 of an optical modulator 1 according to the third embodiment is a bonding wire that is provided in such a manner that two wires intersect each other on an immediately upward side of the via V in the multilayer substrate as illustrated in FIG. 8, or a ribbon that is thicker than the bonding wire instead of the plate member that covers approximately the entirety of the upper surface of the multilayer substrate illustrated in FIG. 2.

Figure 8:
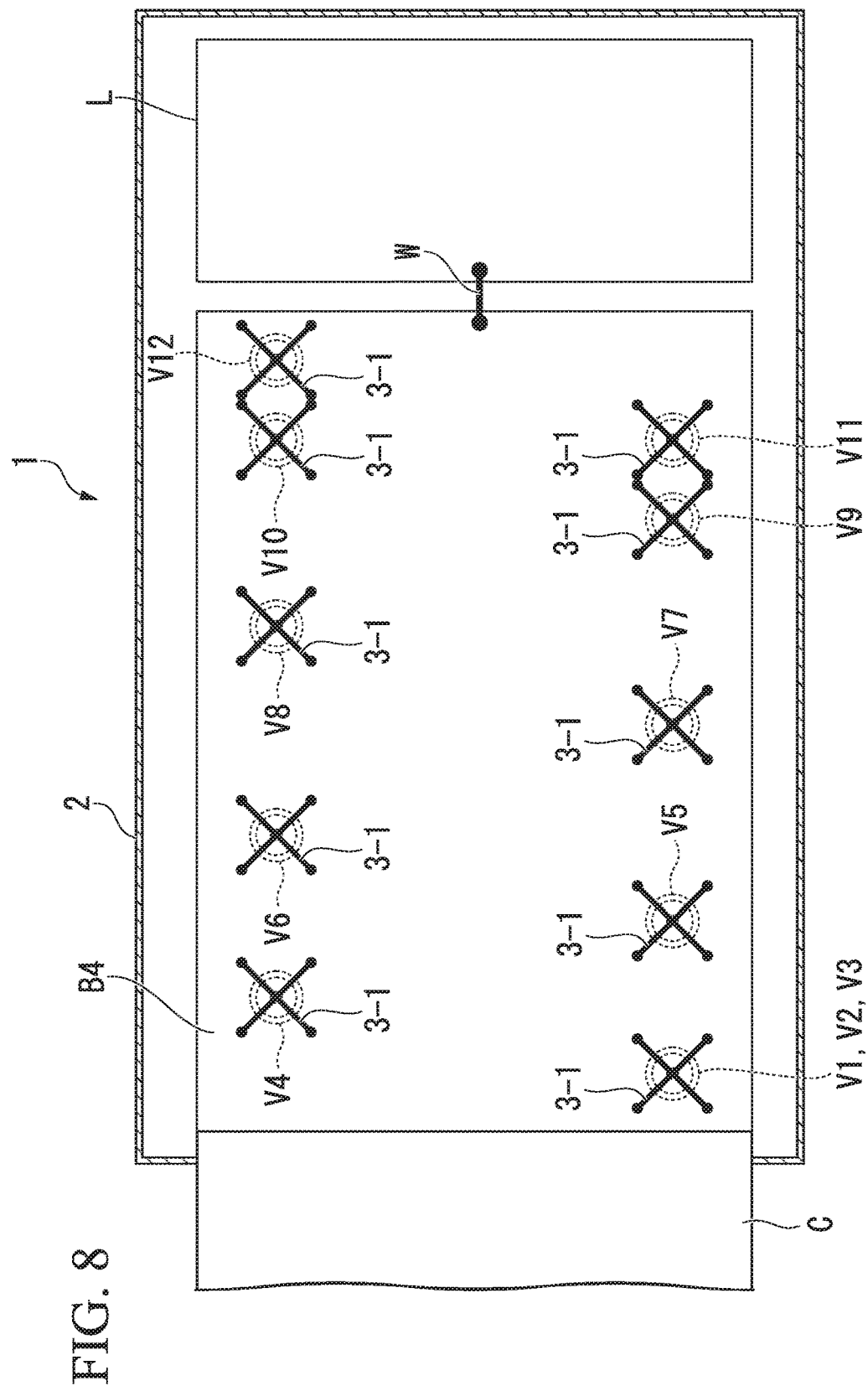
FIG. 8 is a view illustrating an example of the inside of a housing 2 of an optical modulator 1 according to a third embodiment when seen from a vertically upward side to a vertically downward side.

FIG. 8 is a view illustrating an example of the inside of a housing 2 of the optical modulator 1 according to the third embodiment when seen from a vertically upward side to a vertically downward side. Furthermore, in FIG. 8, connection between the shield 3-1 and the housing 2 and the transmission line F are omitted. As illustrated in FIG. 6, the shield 3-1 is provided only on an immediately upward side of each of the vias V. Here, in a case where the via V, in which the diameter of the central conductor CC is 0.1 mm, the inner diameter of the ground conductor GC is 1.36 mm, and the dielectric constant of the dielectric body DB is 9.8, is provided in the relay substrate B, the shield 3-1 has a structure illustrated in FIG. 9, and thus it is possible to reduce a radiation component that is radiated from the via V. At this time, the radiation component is reduced to a certain extent in which the radiation component is "sufficiently shielded" as described in the second embodiment.

Figure 9:
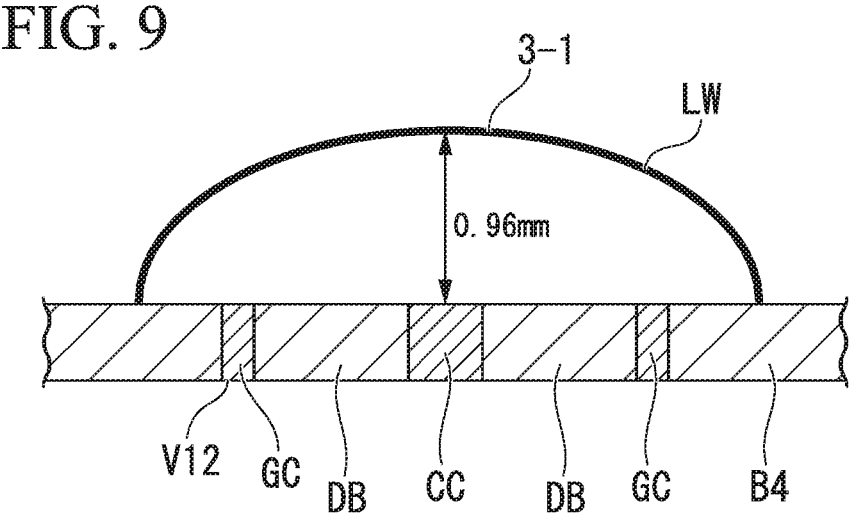
FIG. 9 is a view illustrating an example of a side view of a shield 3-1 according to the third embodiment.

FIG. 9 is a view illustrating an example of a side view of the shield 3-1 according to the third embodiment. Furthermore, in FIG. 9, only one of two wires of the shield 3-1 illustrated in FIG. 8 is illustrated, and the other wire is omitted. As illustrated in FIG. 9, the shield 3-1 is provided on an immediately upward side of the via V in such a manner that a height from the center of the via V to the shield 3-1 becomes 0.96 mm, and a length LW of the wire of the shield 3-1 becomes 2.36 mm. Furthermore, the dimensions are examples of a case where the via, in which the diameter of the central conductor CC is 0.1 mm, the inner diameter of the ground conductor GC is 1.36 mm, and the dielectric constant of the dielectric body DB is 9.8, is provided in the relay substrate B. In the via V, if parts or the entirety of the diameter of the central conductor CC, the inner diameter of the ground conductor GC, and the dielectric constant of the dielectric body DB are changed, the diameter or the thickness of the shield 3-1 is different from a value illustrated in FIG. 9 in accordance with the change.

In addition, in the shield 3-1, wires having a structure illustrated in FIG. 9 are provided to intersect each other on an immediately upward side of the via V as illustrated in FIG. 8. When a radiation component radiated from the via V is reduced due to the structure of the shield 3-1 illustrated in FIG. 9, the radiation component radiated from the via V causes the cavity resonance phenomenon only to a certain extent in which the deep D does not occur in the transmission characteristics of the RF signal in the optical modulator 1. According to this, the shield 3-1 can suppress the cavity resonance phenomenon due to the radiation component that is radiated from the via V. As a result, it is possible to suppress occurrence of the deep D in the transmission characteristics of the optical modulator 1.

Furthermore, for example, the shield 3-1 can employ a configuration of using one or greater wires such as a configuration in which two wires are arranged in parallel to each other on an immediately upward side of the via V, a configuration in which one wire is provided, or a configuration in which three or greater wires are provided instead of the configuration in which the two wires intersect each other on an immediately upward side of the via V.

As described above, in the optical modulator 1 according to the third embodiment, the shield 3-1 as a bonding wire, in which two wires are provided to intersect each other on an immediately upward side of the via V in the multilayer substrate, is provided on the multilayer substrate. According to this, the optical modulator 1 can attain the same effect as in the first embodiment.

<Fourth Embodiment>

Hereinafter, a fourth embodiment of the invention will be described with reference to the accompanying drawings. Furthermore, in the fourth embodiment, the same reference numeral will be given the same constituent unit as in the first embodiment, and description thereof will be omitted. A shield 3-1 of an optical modulator 1 according to the fourth embodiment is a mesh-shaped member, in which two wires are provided to intersect each other on an immediately upward side of the via V in the multilayer substrate as illustrated in FIG. 10, instead of the plate member that covers approximately the entirety of the upper surface of the multilayer substrate illustrated in FIG. 2.

Figure 10:
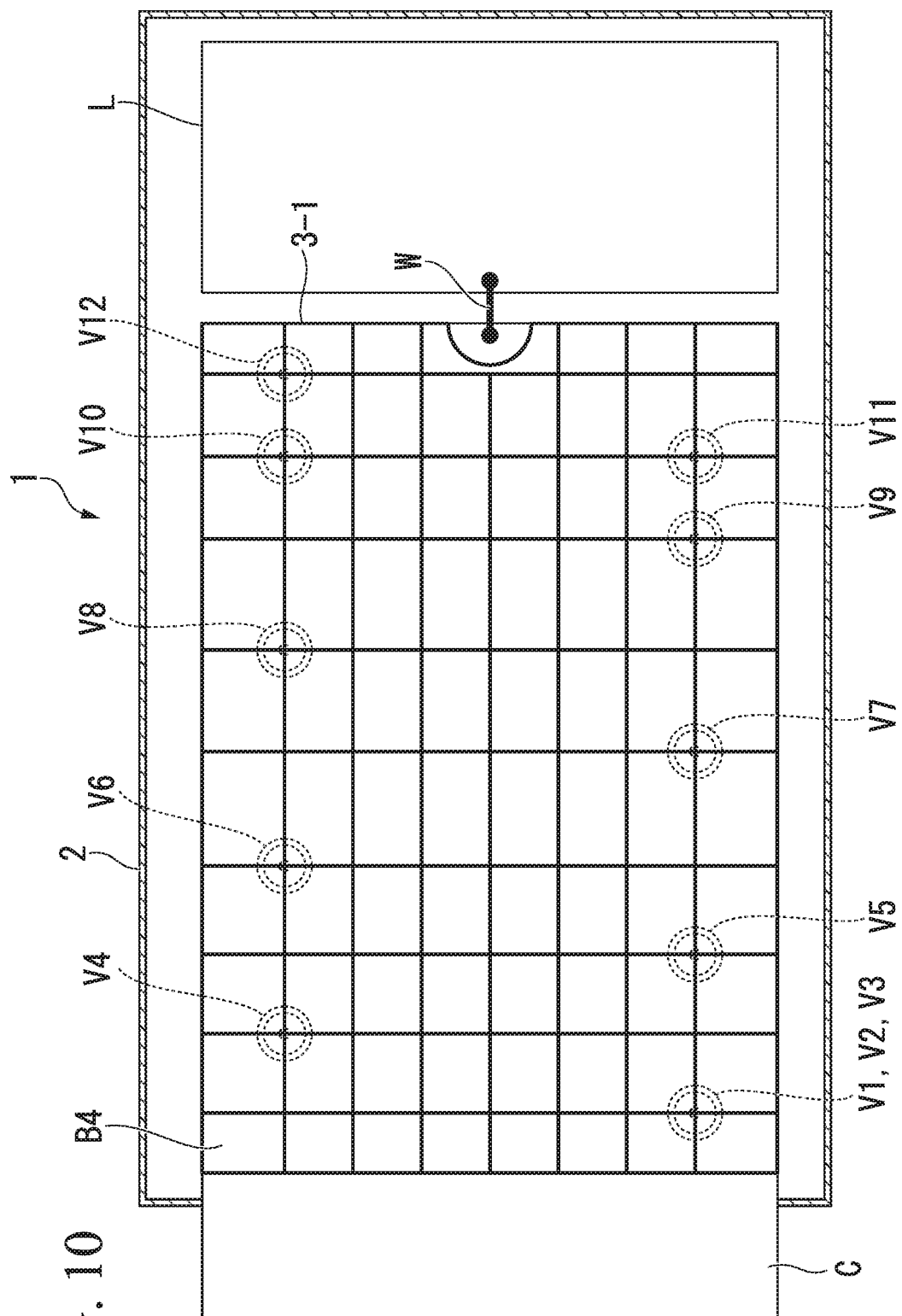
FIG. 10 is a view illustrating an example of a side view of a shield 3-1 according to a fourth embodiment.

FIG. 10 is a view illustrating an example of a side view of the shield 3-1 according to the fourth embodiment. As illustrated in FIG. 10, the shield 3-1 that is a mesh-shaped member reduces a radiation component radiated from the via V by using two wires that pass through an immediately upward side of the via V. At this time, the radiation component is reduced to a certain extent in which the radiation component is "sufficiently shielded" as described in the second embodiment. According to this, the shield 3-1 suppresses the cavity resonance phenomenon due to the radiation component that is radiated from the via V. As a result, the shield 3-1 can suppress occurrence of the deep D in the transmission characteristics of the optical modulator 1. Furthermore, the number of the wires, which pass through an immediately upward side of the via V, may be a numerical value other than two as long as the radiation component radiated from the via V can be sufficiently shielded.

As described above, in the optical modulator 1 according to the fourth embodiment, the shield 3-1 as the mesh-shaped member, in which two wires are provided to intersect each other on an immediately upward side of the via V in the multilayer substrate, is provided on the multilayer substrate. According to this, the optical modulator 1 can attain the same effect as in the first embodiment.

<Fifth Embodiment>

Hereinafter, a fifth embodiment of the invention will be described. Furthermore, in the fifth embodiment, the same reference numeral will be given to the same constituent unit as in the first embodiment, and description thereof will be omitted. An optical switch 4 according to the fifth embodiment includes the optical modulator 1 described in the first to fourth embodiments, and a switch that switches on/off (switches an output) of an optical signal that is input from a light source (not illustrated) to a substrate containing lithium niobate by an optical modulation section chip L of the optical modulator 1.

Furthermore, in a case where a plurality of output destinations exist with respect to an optical signal that is modulated in the optical modulator 1, the optical switch 4 according to the fifth embodiment may employ a configuration provided with a switch that selects any one of the plurality of output destinations instead of the configuration provided with the switch that switches on/off (switches an output) of the optical signal that is input from the light source (not illustrated) to the substrate that contains lithium niobate by the optical modulation section chip L of the optical modulator 1.

As described above, the optical switch 4 according to the fifth embodiment is provided with the optical modulator 1 described in the first to fourth embodiments, and thus the optical switch 4 can attain the same effect as in the first embodiment.

Furthermore, the shield 3-1 may have a configuration in which parts or the entirety of the configurations in the above-described embodiments are combined.

BACKGROUND OF INVENTION

Hereinafter, description will be given of the background of the invention with reference to the optical modulator X, which is not provided with the shield 3-1 illustrated in FIG. 4, as an example. In the optical modulator X, the transmission characteristics of the RF signal, which is input to the optical modulator X, may deteriorate due to the cavity resonance phenomenon that is caused by reflection of a radiation component of the RF signal, which radiated into the housing 2 from the lead pin or the via V provided in the relay substrate B toward a vertically upward side or a vertically downward side, from an inner wall surface of the housing 2.

As an effective solution for deterioration of the transmission characteristics in the cavity resonance phenomenon, there is a method in which an internal space of the housing 2 is made to be smaller to further raise a cavity resonance frequency than a frequency band that is used by the optical modulator X, or a method in which the cavity resonance at the maximum usage frequency band in the optical modulator X is set to an attenuated state.

However, the height of the housing 2 is restricted depending on the size of components which are mounted on an inner side of the housing 2. For example, it is necessary to secure an electronic component mounting space on an inner side of the optical modulator X in a substrate in which a bias monitoring photodetector mounted on the optical modulation section chip L, a chip capacitor or a chip resistor which includes an impedance transformer disposed on the relay substrate B, a termination resistor that terminates the RF signal are mounted, and the like. In addition, similar to a polarization multiplexing modulator, in a configuration in which a plurality of optical components such as a polarization rotation element, a retardation film, and a collimator lens which have a size of approximately several millimeters are mounted, it is difficult to reduce the height of the housing 2.

In addition, in a case of using a ferroelectric crystal material such as $LiNbO_3$ as a material of the optical modulation section chip L, typical examples of a signal wiring on a chip that is used include a co-planar waveguide (CPW) having a high aspect ratio and a wide gap (a ratio of a height to a width of a signal line is great and is typically 1 or greater, and an area between ground electrodes is 50 μm or greater). In this case, when a conductor exists on an upper side of a signal line of the optical modulation section chip L, the transmission characteristics and the like deteriorate. As an example, in a case where a metallic housing inner wall exists at a position of a height that is approximately two or less times a distance between ground electrodes of the CPW, this configuration has an effect on a propagation speed of a microwave or impedance (frequency dependency of an effective refractive index), thereby leading to deterioration of the transmission characteristics.

In addition, a length of the optical modulation section chip L in an optical propagating direction may be only several millimeters due to a wide band or a low drive voltage. This is one cause for occurrence of overlapping of a plurality of substrate modes and signal deterioration.

As described above, in the optical modulator X, it is difficult to reduce the height of the housing 2, and thus there is a demand for any method of shielding a radiation component of the RF signal that is radiated from the lead pin or the via V which is provided in the relay substrate B toward a vertically upward side or a vertically downward side. The optical modulator 1 can shields the radiation component of the RF signal, which is radiated from the lead pin or the via V which is provided in the relay substrate B toward a vertically upward side or a vertically downward side, by using the shield 3-1 and the shield 3-2. As a result, it is possible to more reliably suppress deterioration of the transmission characteristics in comparison to the optical modulator X.

Hereinbefore, embodiments of the invention have been described in detail with reference to the accompanying drawings, but a specific configuration is not limited to the embodiments, and modifications, substitutions, deletions, and the like can be made in a range not departing from the gist of the invention.

REFERENCE SIGNS LIST

1: Optical modulator
2: Housing
3, 3-1, 3-2: Shield
4: Optical switch

The invention claimed is:

1. An optical modulator, comprising:
a relay substrate;
a first transmission line that is provided on a flat surface of the relay substrate, and transmits, along the flat surface, an electrical signal of a predetermined frequency that has been input from an outer side;
a second transmission line that is provided in the relay substrate, and transmits the electrical signal in a direction that is not included in the flat surface;
a modulation unit that modulates an optical signal by using the electrical signal that is transmitted by the first transmission line and the second transmission line;
a housing that accommodates the relay substrate and has an internal space with a height that is at least ¼ times a wavelength of the electrical signal, the height being measured between the housing and a contact between the first transmission line and the second transmission line and measured in a normal direction of the flat surface with respect to at least part of the contact; and
a shield disposed within the housing and configured to suppress a cavity resonance phenomenon by shielding a radiation component of the electrical signal that is radiated toward the internal space from the contact between the first transmission line and the second transmission line.

2. The optical modulator according to claim 1, wherein the relay substrate is a multilayer substrate in which a plurality of layers are laminated.

3. The optical modulator according to claim 1, wherein the shield is either a plate member that covers at least the contact in a radiation of the radiation component, or a bonding wire that bridges on the radiation side.

4. An optical switch, comprising:
a relay substrate;
a first transmission line that is provided on a flat surface of the relay substrate, and transmits, along the flat surface, an electrical signal of a predetermined frequency that has been input from an outer side;
a second transmission line that is provided in the relay substrate, and transmits the electrical signal in a direction that is not included in the flat surface;
a modulation unit that modulates an optical signal by using the electrical signal that is transmitted by the first transmission line and the second transmission line;
a housing that accommodates the relay substrate and has an internal space with a height that is at least ¼ times a wavelength of the electrical signal, the height being measured between the housing and a contact between the first transmission line and the second transmission line and measured in a normal direction of the flat surface with respect to at least part of the contact;
a shield disposed within the housing and configured to suppress a cavity resonance phenomenon by shielding a radiation component of the electrical signal that is radiated toward the internal space from the contact between the first transmission line and the second transmission line; and
a switch that switches an output of the optical signal.

* * * * *